(12) United States Patent
Liu et al.

(10) Patent No.: US 10,742,294 B2
(45) Date of Patent: Aug. 11, 2020

(54) CHANNEL STATE INFORMATION REPORTING METHOD, CHANNEL STATE INFORMTION READING METHOD, AND RELATED DEVICE

(71) Applicant: Huawei Technologies Co., Ltd., Shenzhen (CN)

(72) Inventors: Jianqin Liu, Beijing (CN); Ruiqi Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/188,897

(22) Filed: Nov. 13, 2018

(65) Prior Publication Data

US 2019/0081683 A1    Mar. 14, 2019

Related U.S. Application Data

(63) Continuation of application No. PCT/CN2016/082136, filed on May 13, 2016.

(51) Int. Cl.
*H04B 7/06* (2006.01)
*H04L 1/06* (2006.01)
(Continued)

(52) U.S. Cl.
CPC ......... *H04B 7/0626* (2013.01); *H04B 7/0456* (2013.01); *H04B 7/0473* (2013.01); *H04B 7/0486* (2013.01); *H04B 7/063* (2013.01); *H04B 7/0639* (2013.01); *H04B 17/309* (2015.01); *H04B 17/373* (2015.01);
(Continued)

(58) Field of Classification Search
CPC .. H04B 7/0626; H04B 17/309; H04B 17/373; H04B 7/0456; H04B 7/0473; H04B 7/0486; H04B 7/063; H04B 7/0639; H04L 1/0026; H04L 1/06; H04L 5/0057
See application file for complete search history.

(56) References Cited

U.S. PATENT DOCUMENTS

| | | | |
|---|---|---|---|
| 2011/0141987 | A1 | 6/2011 | Nam et al. |
| 2012/0281552 | A1 | 11/2012 | Niu et al. |

(Continued)

FOREIGN PATENT DOCUMENTS

| | | | |
|---|---|---|---|
| CN | 102045762 | A | 5/2011 |
| CN | 102684835 | A | 9/2012 |

(Continued)

OTHER PUBLICATIONS

Qualcomm Incorporated, "CSI feedback performance requirements for EB/FD-MIMO", 3GPP TSG-RAN WG4 #78, Malta, Feb. 15-19, 2016, XP051056490, 10 pages.

(Continued)

*Primary Examiner* — Freshteh N Aghdam
(74) *Attorney, Agent, or Firm* — Slater Matsil, LLP

(57) ABSTRACT

Embodiments provide a channel state information reporting method, including: determining, by a terminal, R first precoding matrix indicators PMIs of M first reference signal resources, and determining a channel quality indicator CQI based on the R first PMIs, where M and R are integers greater than or equal to 1; and reporting, by the terminal, channel state information, where the channel state information includes the R first PMIs and N CQIs.

19 Claims, 6 Drawing Sheets

(51) Int. Cl.
  *H04B 7/0456* (2017.01)
  *H04B 17/309* (2015.01)
  *H04B 17/373* (2015.01)
  *H04L 1/00* (2006.01)
  *H04L 5/00* (2006.01)
(52) U.S. Cl.
  CPC .............. *H04L 1/0026* (2013.01); *H04L 1/06* (2013.01); *H04L 5/0057* (2013.01)

(56) References Cited

U.S. PATENT DOCUMENTS

| | | |
|---|---|---|
| 2013/0343216 A1 | 12/2013 | Su et al. |
| 2014/0079100 A1 | 3/2014 | Kim et al. |
| 2015/0124726 A1 | 5/2015 | Ni et al. |
| 2015/0270881 A1* | 9/2015 | Gao ................. H04B 7/0456 370/329 |
| 2015/0288499 A1 | 10/2015 | Nam et al. |
| 2015/0341092 A1* | 11/2015 | Park .................. H04B 7/0469 370/329 |
| 2016/0080052 A1 | 3/2016 | Li et al. |
| 2017/0012691 A1 | 1/2017 | Lee et al. |
| 2017/0222707 A1* | 8/2017 | Chen ...................... H04B 7/06 |
| 2017/0244459 A1* | 8/2017 | Chen ................. H04B 7/0617 |
| 2017/0289832 A1 | 10/2017 | Kim et al. |
| 2018/0069613 A1* | 3/2018 | Li .................... H04B 7/0456 |
| 2018/0091273 A1 | 3/2018 | Choi et al. |

FOREIGN PATENT DOCUMENTS

| | | |
|---|---|---|
| CN | 103746779 A | 4/2014 |
| CN | 104335629 A | 2/2015 |
| CN | 104782071 A | 7/2015 |
| EP | 2852084 A1 | 3/2015 |
| JP | 2014529945 A | 11/2014 |
| JP | 2015536110 A | 12/2015 |
| WO | 2016159621 A1 | 10/2016 |

OTHER PUBLICATIONS

Itri, "CSI Reporting for FD-MIMO", 3GPP TSG RAN WG1, Meeting #83, R1-157085, Anaheim, USA, Nov. 15, 2015, XP051003376, 5 pages.

LG Electronics, "Discussion on CSI types and reporting modes for Class A and B", 3GPP TSG RAN WG1 Meeting #82bis, Malmo, Sweden, Oct. 4, 2015, XP051002312, 5 pages.

Samsung, "Elevation Beamforming/Full-Dimension (FD) MIMO for LTE", 3GPP TSG RAN Meeting #70, RP-151845, Sitges, Spain, Dec. 5, 2015, XP051655401, 11 pages.

Samsung, "Discussion on CSI process enhancement for EBF and FD-MIMO," 3GPP TSG RAN WG1 Meeting #80 R1-150384, Athens, Greece, Feb. 9-13, 2015, 6 pages.

Huawei et al., "Codebook design for 16 ports 2D antenna arrays," 3GPP TSG RAN WG1 Meeting #82bis, R1-155077, Malmo, Sweden, Oct. 5-9, 2015, 10 pages.

Itri, "Performance Evaluation of 2D Codebooks for FD-MIMO," 3GPP TSG RAN WG1 Meeting #82bis, R1-155560, Malmo, Sweden, Oct. 5-9, 2015, 10 pages.

Qualcomm Inc., "Codebook design targeting 2D antenna array," 3GPP TSG-RAN WG1 #80bis, R1-151414, Belgrade, Serbia, Apr. 20-24, 2015, 7 pages.

\* cited by examiner

CHANNEL STATE INFORMATION REPORTING METHOD, CHANNEL STATE INFORMTION READING METHOD, AND RELATED DEVICE

CROSS-REFERENCE TO RELATED APPLICATIONS

This application is a continuation of International Application No. PCT/CN2016/082136, filed on May 13, 2016, the disclosure of which is hereby incorporated by reference in its entirety.

TECHNICAL FIELD

The present invention relates to the field of communications technologies, and in particular, to a channel state information reporting method, a channel state information reading method, and a related device.

BACKGROUND

A channel state information-reference signal (CSI-RS) is used as a reference signal for channel state information measurement in a 3rd Generation Partnership Project (3GPP) Long Term Evolution (LTE) system. To further improve spectrum efficiency, more antenna configurations, especially antenna configurations of more than eight antenna ports based on an active antenna system (AAS), are introduced in a current LTE R13 standard. For example, there may be 16, 32, or 64 antenna ports.

In a current technology, both a CSI reporting type A and a CSI reporting type B are supported. CSI measurement in the CSI reporting type A is based on a non-beamforming CSI-RS resource, and CSI measurement in the CSI reporting type B is based on a beamforming CSI-RS resource. A CSI process corresponding to the non-beamforming CSI-RS resource is a CSI process of the type A, and a CSI process corresponding to the beamforming CSI-RS resource is a CSI process of the type B. As a quantity of antenna ports increases, reference signal resource overheads in the CSI process of the type A accordingly increase.

SUMMARY

Embodiments of the present invention provide a channel state information reporting method, a channel state information reading method, and a related device, to reduce reference signal resource overheads in a CSI process.

According to a first aspect, an embodiment of the present invention provides a channel state information reporting method. The method includes performing, by a terminal, channel quality measurement on M first reference signal resources, to obtain R first PMIs, then determining, by the terminal, a CQI based on the R first PMIs, and finally reporting, by the terminal, channel state information, where the channel state information includes the R first PMIs and N CQIs or the R first PMIs and one CQI. In addition, the R first PMIs may be used by a base station to determine P second PMIs according to a first operational criterion. A dimension of the first PMI is less than a dimension of the second PMI, and this reflects that a quantity of ports corresponding to a first reference signal resource is less than a quantity of total antenna ports that are to perform transmission, so that resource overheads can be reduced.

With reference to the first aspect, in a possible design, if the reported channel state information includes the R first PMIs and the N CQIs, the determining a channel quality indicator CQI based on the R first PMIs is specifically implemented as follows: determining, by the terminal, the P second PMIs and/or the N CQIs based on the R first PMIs and the first operational criterion; or if the reported channel state information includes the R first PMIs and the CQI, the determining a channel quality indicator CQI based on the R first PMIs is specifically implemented as follows: determining one second PMI and one CQI based on the R first PMIs and a second operational criterion.

With reference to the first aspect, in a possible design, if the reported channel state information includes the R first PMIs and the CQI, the reported channel state information further includes a CQI index indicator corresponding to the CQI. The CQI index indicator corresponds to an operational criterion for obtaining the CQI based on the R first PMIs. The terminal reports the CQI index indicator corresponding to the CQI, to notify the base station of the operational criterion for obtaining the CQI.

With reference to the first aspect, in a possible design, the first operational criterion and the second operational criterion are configured by the base station for the terminal, or the first operational criterion and the second operational criterion are predefined by the base station and the terminal.

With reference to the first aspect, in a possible design, the first operational criterion and the second operational criterion include at least one of a direct product, a direct sum, and an interpolation.

With reference to the first aspect, in a possible design, the R first PMIs are used by the base station to determine a precoding matrix and/or a quantity of ports of a second reference signal resource. To be specific, the base station uses the R first PMIs for beamforming on the second reference signal resource. The first reference signal resource and the second reference signal resource are different types of reference resources. The first reference signal resource is a non-beamforming reference signal resource of a type A, and the second reference signal resource is a beamforming reference signal resource of a type B. Beamforming on the reference signal resource of the type B can be trained by measuring the reference signal resource of the type A, so that accuracy of the beamforming that acts on the reference signal resource of the type B is effectively improved, and system performance based on the reference signal resource of the type B is further improved.

According to a second aspect, an embodiment of the present invention provides a channel state information reporting method. The method includes determining, by a terminal, channel state information, where the channel state information includes first channel state information of a first reference signal resource and second channel state information of a second reference signal resource. The method also includes determining, by the terminal, a reporting mode of reporting the channel state information, and reporting the channel state information based on the reporting mode. The first channel state information is slow-changing and long-term channel state information, and the second channel state information is fast-changing and short-term channel state information. Therefore, the first reference signal resource corresponding to the first channel state information may have a relatively long sending period, and antenna ports of the first reference signal resource may be only some of total antenna ports, so as to reduce resource overheads. In addition, the second reference signal resource corresponding to the second channel state information is determined based on the first channel state information. For example, beamforming that acts on the second reference signal resource is based on precoding matrix indicator information in the first channel state information, and a quantity of ports of the second reference signal resource is based on rank indicator information in the first channel state information, so that accuracy of the beamforming that acts on the second reference signal resource and system performance are effectively improved.

With reference to the second aspect, in a possible design, a period of the first reference signal resource is greater than or equal to a period of the second reference signal resource, and a subframe offset of the first reference signal resource is different from a subframe offset of the second reference signal resource. A sending time of the first reference signal resource is decoupled from a sending time of the second reference signal resource, so that the first reference signal resource has a relatively long sending period, reducing first reference signal resource overheads in a time domain dimension.

With reference to the second aspect, in a possible design, measurement limitation signaling of the first reference signal resource and measurement limitation signaling of the second reference signal resource are independently configured.

With reference to the second aspect, in a possible design, sending and/or measurement limitation of each first reference signal resource and/or each second reference signal resource are/is notified by a base station by using higher layer signaling or layer 1 signaling.

With reference to the second aspect, in a possible design, the determining, by the terminal, a reporting mode of reporting the channel state information is specifically implemented as follows: determining, by the terminal based on a feedback type indicator, the reporting mode of reporting the channel state information.

With reference to the second aspect, in a possible design, the reported channel state information includes an RI, and the determining, by the terminal, a reporting mode of reporting the channel state information is specifically implemented as follows: determining, by the terminal based on a method for measuring the RI, the reporting mode of reporting the channel state information.

With reference to the second aspect, in a possible design, the first channel state information includes at least one of an RI and a first PMI, and the second channel state information includes at least one of a reference signal resource index CRI, a CQI, and a second PMI; or the first channel state information includes at least one of an RI, a first PMI, and a second PMI, and the second channel state information includes at least one of an RI, a CRI, a CQI, a first PMI, and a second PMI; or the first channel state information includes at least one of an RI, a CQI, a first PMI, and a second PMI, and the second channel state information includes at least one of an RI, a CRI, a CQI, a first PMI, and a second PMI.

With reference to the second aspect, in a possible design, a reporting period of the first channel state information is greater than or equal to a reporting period of the second channel state information. A sending time of the first reference signal resource is decoupled from a sending time of the second reference signal resource, so that the first reference signal resource has a relatively long sending period, reducing first reference signal resource overheads in a time domain dimension.

With reference to the second aspect, in a possible design, a reporting mode of the first channel state information is a periodic reporting mode, and a reporting mode of the second channel state information is an aperiodic reporting mode; or a reporting mode of the first channel state information is an aperiodic reporting mode, and a reporting mode of the second channel state information is a periodic reporting mode.

With reference to the second aspect, in a possible design, the first channel state information includes Q first PMIs or J CRIs, and Q and J are integers greater than or equal to 2.

According to a third aspect, an embodiment of the present invention provides a channel state information reading method. The method includes reading, by a base station, channel state information reported by a terminal, where the channel state information includes R first PMIs and N CQIs, or the channel state information includes R first PMIs and one CQI, where the R first PMIs are used by the base station to determine P second PMIs according to a first operational criterion. A dimension of the first PMI is less than a dimension of the second PMI, and this reflects that a quantity of ports corresponding to a first reference signal resource is less than a quantity of total antenna ports that are to perform transmission, so that resource overheads can be reduced.

With reference to the third aspect, in a possible design, the first operational criterion and a second operational criterion are configured by the base station for the terminal, or the first operational criterion and a second operational criterion are predefined by the base station and the terminal.

With reference to the third aspect, in a possible design, the first operational criterion and the second operational criterion include at least one of a direct product, a direct sum, and an interpolation.

With reference to the third aspect, in a possible design, the method further includes: determining, by the base station, a precoding matrix and/or a quantity of ports of a second reference signal resource based on the R first PMIs. To be specific, the base station uses the R first PMIs for beamforming on the second reference signal resource. The first reference signal resource and the second reference signal resource are different types of reference resources. The first reference resource is a non-beamforming reference signal resource of a type A, and the second reference signal resource is a beamforming reference signal resource of a type B. It may be learned that beamforming on the reference signal resource of the type B can be trained by measuring the reference signal resource of the type A, so that accuracy of the beamforming that acts on the reference signal resource of the type B is effectively improved, and system performance based on the reference signal resource of the type B is further improved.

According to a fourth aspect, an embodiment of the present invention provides a channel state information reading method. The method includes reading, by a base station, channel state information reported by a terminal, where the channel state information includes first channel state information of a first reference signal resource and second channel state information of a second reference signal resource, and a reporting mode of the channel state information is determined by the terminal based on the channel state information.

With reference to the fourth aspect, in a possible design, a period of the first reference signal resource is greater than or equal to a period of the second reference signal resource, and a subframe offset of the first reference signal resource is different from a subframe offset of the second reference signal resource.

With reference to the fourth aspect, in a possible design, measurement limitation signaling of the first reference signal resource and measurement limitation signaling of the second reference signal resource are independently configured.

With reference to the fourth aspect, in a possible design, sending and/or measurement limitation of each first reference signal resource and/or each second reference signal resource are/is notified by the base station by using higher layer signaling or layer 1 signaling.

With reference to the fourth aspect, in a possible design, a reporting mode of the first channel state information is a periodic reporting mode, and a reporting mode of the second channel state information is an aperiodic reporting mode; or a reporting mode of the first channel state information is an aperiodic reporting mode, and a reporting mode of the second channel state information is a periodic reporting mode.

With reference to the fourth aspect, in a possible design, the first channel state information includes Q first PMIs or J CRIs, and Q and J are integers greater than or equal to 2.

According to a fifth aspect, an embodiment of the present invention provides a terminal, including a module configured to perform the method according to the first aspect.

According to a sixth aspect, an embodiment of the present invention provides a terminal, including a module configured to perform the method according to the second aspect.

According to a seventh aspect, an embodiment of the present invention provides a base station, including a module configured to perform the method according to the third aspect.

According to an eighth aspect, an embodiment of the present invention provides a base station, including a module configured to perform the method according to the fourth aspect.

According to a ninth aspect, an embodiment of the present invention provides a terminal. The terminal includes a processor, and the processor is configured to support the terminal in performing corresponding functions in the channel state information reporting method according to the first aspect. The terminal may further include a memory. The memory is configured to be coupled to the processor, and stores a program instruction and data that are necessary for the terminal. The terminal may further include a communications interface, configured to implement communication between the terminal and another device or communications network.

According to a tenth aspect, an embodiment of the present invention provides a terminal. The terminal includes a processor, and the processor is configured to support the terminal in performing corresponding functions in the channel state information reporting method according to the second aspect. The terminal may further include a memory. The memory is configured to be coupled to the processor, and stores a program instruction and data that are necessary for the terminal. The terminal may further include a communications interface, configured to implement communication between the terminal and another device or communications network.

According to an eleventh aspect, an embodiment of the present invention provides a base station. The base station includes a processor, and the processor is configured to support the base station in performing corresponding functions in the channel state information reading method according to the third aspect. The base station may further include a memory. The memory is configured to be coupled to the processor, and stores a program instruction and data that are necessary for the base station. The base station may further include a communications interface, configured to implement communication between the base station and another device or communications network.

According to a twelfth aspect, an embodiment of the present invention provides a base station. The base station includes a processor, and the processor is configured to support the base station in performing corresponding functions in the channel state information reading method according to the fourth aspect. The base station may further include a memory. The memory is configured to be coupled to the processor, and stores a program instruction and data that are necessary for the base station. The base station may further include a communications interface, configured to implement communication between the base station and another device or communications network.

According to a thirteenth aspect, an embodiment of the present invention provides a computer storage medium. The computer storage medium is configured to store a computer software instruction used by the terminal provided in the fifth aspect, and the computer software instruction includes a program designed for executing the foregoing aspect.

According to a fourteenth aspect, an embodiment of the present invention provides a computer storage medium. The computer storage medium is configured to store a computer software instruction used by the terminal provided in the sixth aspect, and the computer software instruction includes a program designed for executing the foregoing aspect.

According to a fifteenth aspect, an embodiment of the present invention provides a computer storage medium. The computer storage medium is configured to store a computer software instruction used by the base station provided in the seventh aspect, and the computer software instruction includes a program designed for executing the foregoing aspect.

According to a sixteenth aspect, an embodiment of the present invention provides a computer storage medium. The computer storage medium is configured to store a computer software instruction used by the base station provided in the eighth aspect, and the computer software instruction includes a program designed for executing the foregoing aspect.

In comparison with the current technology, a PMI with a higher dimension may be obtained by using a PMI with a lower dimension in the solution provided in the embodiments of the present invention, to reduce resource overheads.

These aspects or other aspects of the present invention are more concise and comprehensible in descriptions of the following embodiments.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
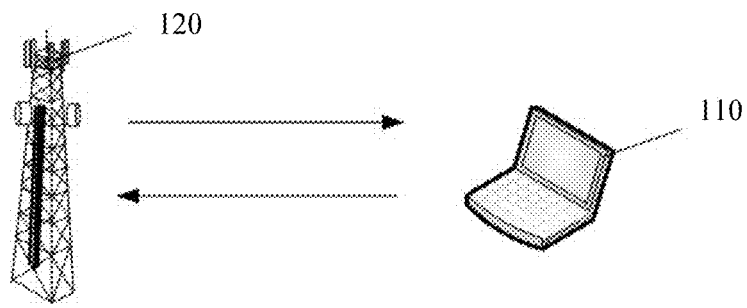
FIG. 1 is a schematic diagram of a communications system according to an embodiment of the present invention.

To make a person skilled in the art understand the technical solutions in the present invention better, the following describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Details are separately described in the following.

In the specification, claims, and accompanying drawings of the present invention, the terms "first", "second", "third", "fourth", and so on are intended to distinguish between different objects but do not indicate a particular order. In addition, the terms "include", "have", or any other variant thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

"Embodiment" mentioned in this specification means that a particular characteristic, structure, or feature described with reference to the embodiments may be included in at least one embodiment of the present invention. The phrase in all locations in this specification does not necessarily mean a same embodiment, or an independent or alternative embodiment exclusive of other embodiments. A person skilled in the art explicitly and implicitly understands that the embodiments described in this specification may be combined with other embodiments.

Some terms in this application are described below, to help a person skilled in the art have a better understanding.

(1) A terminal, also referred to as user equipment (UE), is a device that provides a user with voice and/or data connectivity, for example, a handheld device or an in-vehicle device having a wireless connection function. For example, a common terminal includes a mobile phone, a tablet computer, a notebook computer, a palmtop computer, a mobile Internet device (MID), and a wearable device such as a smartwatch, a smart band, and a pedometer.

(2) A base station is a radio access network (RAN) device on an access network side in a cellular network. The RAN device is a device that connects the terminal to a wireless network, and includes but is not limited to an evolved NodeB (eNB), a radio network controller (RNC), a NodeB (NB), a base station controller (BSC), a base transceiver station (BTS), a home base station (such as a home evolved NodeB or a home NodeB, HNB), and a baseband unit (BBU).

(3) Channel state information CSI means a channel attribute of a communication link. The CSI describes a fading factor of a signal on each transmission path. The CSI includes a channel quality indicator (CQI), a precoding matrix indicator (PMI), and a rank indicator (RI). The CQI is used to reflect channel quality of a physical downlink shared channel (PDSCH). For example, 0 to 15 are used to represent the channel quality of the PDSCH, where 0 represents poorest channel quality, and 15 represents best channel quality. The terminal sends the CQI to the base station on a PUCCH/PUSCH. After obtaining the CQI, the base station learns whether a wireless channel condition of a current PDSCH is good. In this way, the base station may schedule the PDSCH accordingly. The RI is used to indicate a valid data layer quantity of the PDSCH. The base station is notified, by using the RI, of a quantity of CWs that can be currently supported by the terminal. The PMI is used to indicate an index of a code word in a codebook set. A multi-antenna MIMO technology is applied in LTE. Therefore, there is a precoding technology in baseband processing at a physical layer of the PDSCH. Precoding herein is simply to multiply various different precoding matrices.

(4) A reference signal resource includes a reference signal for measuring the channel state information. The reference signal includes at least one of the following signals: a cell-specific reference signal (CRS), a channel state information-reference signal (CSI-RS), a demodulation reference signal (DMRS), and a discovery reference signal (DRS). The CSI-RS may further include a non-zero power (NZP) CSI-RS and CSI-IM (CSI-interference measurement).

(5) That a dimension of a second PMI is greater than that of a first PMI indicates that a quantity of rows of a precoding matrix of the second PMI is greater than a quantity of rows of a precoding matrix of the first PMI.

(6) A subframe offset is a subframe offset within one period. If the period is 5 ms, the subframe offset indicates a specific $i^{th}$ subframe in the interval of 5 ms, where i=0, 1, 2, 3, or 4.

(7) Measurement limitation signaling is to limit CSI measurement that is based on a reference signal resource to a subframe. In the embodiments of the present invention, the measurement limitation signaling is used to indicate whether measurement limitation needs to be performed on signal measurement in the CSI measurement and a subframe to which the signal measurement in the CSI measurement is limited.

(8) For higher layer signaling or layer 1 signaling, the higher layer signaling may be radio resource control (RRC) signaling or Media Access Control (MAC) signaling, and the layer 1 signaling is physical layer control signaling.

(9) A direct product is a set obtained by multiplying a plurality of nonempty sets in order. For example, A and B are any two sets. An element x is randomly selected from the set A, and an element y is randomly selected from the set B, to constitute an ordered pair (x, y). Such an ordered pair is used as a new element. A set including elements that are all ordered pairs generated from the two sets is referred to as a direct product of the set A and the set B, and the direct product is denoted as A×B, in other words, A×B={(x, y)|x∈A and y∈B}. A direct sum is a set obtained by adding sub-elements in a plurality of nonempty sets in a corresponding sequence. For example, A and B are any two sets. An element x is randomly selected from the set A, and an element y is randomly selected from the set B, to constitute an ordered pair (x, y). Such an ordered pair is used as a new element. A set including elements that are all ordered pairs generated from the two sets is referred to as a direct sum of the set A and the set B, and the direct sum is denoted as A $\oplus$ B, in other words, A$\oplus$B={(x, y)|x∈A and y∈B}. An interpolation is a function value $y_0, y_1, \ldots,$ or $y_n$ of a known function y=f(x) at n+1 different points $x_0, x_1, \ldots,$ and $x_n$ (in other words, the function passes n+1 points: $(x_0, y_0), (x_1, y_1), \ldots,$ and $(x_n, y_n)$). It may be considered that a polynomial y=Pn(x) that passes the n+1 points and whose maximum power does not exceed n is constructed, so that the polynomial meets Pn(xk)=yk, where k=0, 1, . . . , or n. If a point ε needs to be estimated, where ε≠$x_i$, and i=0, 1, . . . , or n, a value of Pn(ε) may be used as an approximation of an accurate value f(ε). This method is referred to as an interpolation.

(10) "A plurality of" means two or more than two. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

The following describes the embodiments of this application with reference to accompanying drawings.

Referring to FIG. 1, FIG. 1 is a schematic diagram of a communications system according to an embodiment of the present invention. The communications system shown in FIG. 1 includes a terminal 110 and a base station 120. The terminal 110 performs channel quality measurement on M first reference signal resources in a CSI process, to obtain R first PMIs. Then the terminal no may obtain a CQI based on the R first PMIs. Finally the terminal 110 reports channel state information. The channel state information includes the R first PMIs and N CQIs or the R first PMIs and one CQI. The base station 120 reads the channel state information reported by the terminal. The R first PMIs are used by the base station 120 to determine P second PMIs according to a first operational criterion, where a dimension of the second PMI is greater than a dimension of the first PMI. It may be learned that, the dimension of the first PMI is less than the dimension of the second PMI, and this reflects that a quantity of ports corresponding to a first reference signal resource is less than a quantity of total antenna ports that are to perform transmission. In other words, although a quantity of antenna ports that are to perform transmission increases, ports for the first reference signal resource designed in this solution need to be only some of the total antenna ports, and therefore resource overheads can be reduced.

In addition, based on the communications system shown in FIG. 1, the terminal 110 may further determine the channel state information, where the channel state information includes first channel state information of the first reference signal resource and second channel state information of a second reference signal resource. The terminal determines a reporting mode of the channel state information, and reports the channel state information based on the reporting mode. The base station reads the channel state information reported by the terminal. The first channel state information is slow-changing and long-term channel state information, and the second channel state information is fast-changing and short-term channel state information. Therefore, the first reference signal resource corresponding to the first channel state information may have a relatively long sending period, and antenna ports of the first reference signal resource may be only some of total antenna ports, so as to reduce resource overheads. In addition, the second reference signal resource corresponding to the second channel state information is determined based on the first channel state information. For example, beamforming that acts on the second reference signal resource is based on precoding matrix indicator information in the first channel state information, and a quantity of ports of the second reference signal resource is based on rank indicator information in the first channel state information, so that accuracy of the beamforming that acts on the second reference signal resource and system performance are effectively improved.

The following describes the embodiments of the present invention in detail with reference to accompanying drawings, so that a person skilled in the art has a better understanding.

Figure 2:
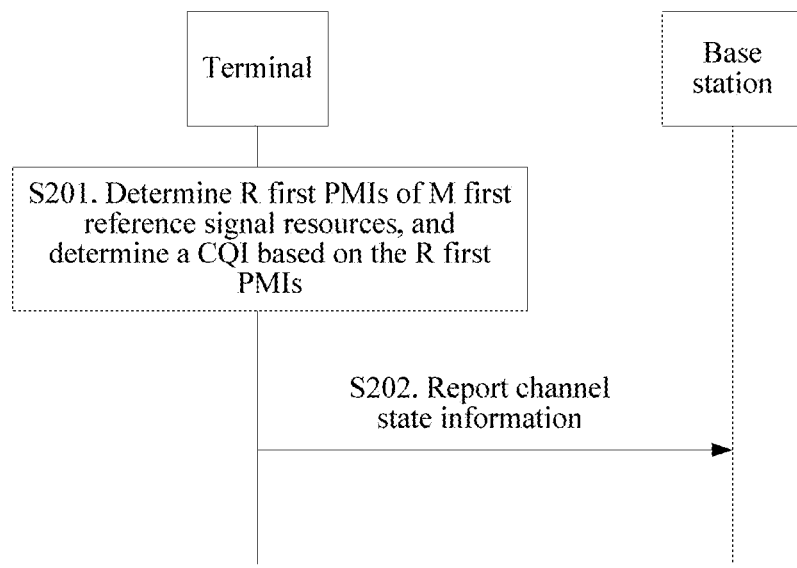
FIG. 2 is a schematic flowchart of a channel state information reporting method according to an embodiment of the present invention.

As shown in FIG. 2, a channel state information reporting method provided in an embodiment of the present invention includes the following steps.

S201. A terminal determines R first precoding matrix indicators PMIs of M first reference signal resources, and determines a channel quality indicator CQI based on the R first PMIs, where M and R are integers greater than or equal to 1.

S202. The terminal reports channel state information, and a base station reads the channel state information reported by the terminal, where the channel state information includes the R first PMIs and N CQIs, or the channel state information includes the R first PMIs and one CQI, the R first PMIs are used by the base station to determine P second PMIs according to a first operational criterion, a dimension of the second PMI is greater than a dimension of the first PMI, and P and N are integers greater than or equal to 1.

It should be noted that the foregoing three values M, R, and P are independent of each other. To be specific, R may be greater than or equal to M, or R may be less than M; P may be greater than or equal to R, or P may be less than R; and so on. A relationship among M, R, and P is not limited in the present invention.

Optionally, if the channel state information includes the R first PMIs and N CQIs, that the terminal determines the CQI based on the R first PMIs in step S201 is specifically implemented as follows: The terminal determines P second PMIs and/or N CQIs based on the R first PMIs and the first operational criterion.

Specifically, it is assumed that M reference signal resources in a CSI process are non-beamforming reference signal resources. The terminal performs channel quality measurement on the M reference signal resources, to obtain R first PMIs. For example, the R first PMIs are respectively denoted as an RS1-PMI, an RS2-PMI, . . . , and an RSR-PMI. Then the terminal obtains P second PMIs based on the R first PMIs by using the first operational criterion. Further the terminal may obtain N CQIs based on the P second PMIs.

Optionally, another manner in which the terminal reports the N CQIs is as follows: The terminal reports a basic CQI and differential items of other N−1 CQIs relative to the basic CQI. For example, it is assumed that to-be-reported N CQIs are a CQI1, a CQI2, . . . , and a CQIN. The terminal reports the CQI1 in the N CQIs and differential items of other N−1 CQIs relative to the CQI1: a delta_CQI2, . . . , and a delta_CQIN. Therefore, the N−1 CQIs: the CQI2, . . . , and the CQIN, are obtained by successively adding the CQI1 to the N−1 CQI differential items: the delta_CQI2, . . . , and the delta_CQIN. The N−1 CQI differential items are reported, to effectively reduce channel state information reporting overheads.

Optionally, if the channel state information includes the R first PMIs and the CQI, that the terminal determines the channel quality indicator CQI based on the R first PMIs in step S201 is specifically implemented as follows: The terminal determines one second PMI and one CQI based on the R first PMIs and a second operational criterion.

Optionally, if the terminal reports only one CQI, the channel state information reported in step S202 further needs to include a CQI index indicator corresponding to the CQI reported by the terminal.

Specifically, it is assumed that M reference signal resources in a CSI process are non-beamforming reference signal resources. The terminal performs channel quality measurement on the M reference signal resources, to obtain R first PMIs. For example, the R first PMIs are respectively denoted as an RS1-PMI, an RS2-PMI, . . . , and an RSR-PMI. Then the terminal may obtain one second PMI based on the M first PMIs by using the second operational criterion. Further the terminal may obtain one CQI based on the second PMI. The second operational criterion is an operational criterion corresponding to a CQI index indicator corresponding to the CQI.

Optionally, the first operational criterion and the second operational criterion may be at least one of a direct product, a direct sum, and an interpolation. The first operational criterion and the second operational criterion are configured by the base station for the terminal, or the first operational criterion and the second operational criterion are predefined by the base station and the terminal. It should be noted that the first operational criterion and the second operational criterion are not limited to the foregoing three operational criteria.

Optionally, the R first PMIs are used by the base station to determine a precoding matrix and/or a quantity of ports of a second reference signal resource.

The first reference signal resource and the second reference signal resource are different types of reference resources. It is assumed that the first reference signal resource is a non-beamforming reference signal resource of a type A, and the second reference signal resource is a beamforming reference signal resource of a type B. The R first PMIs are used by the base station to determine the precoding matrix and/or the quantity of ports of the second reference signal resource. In other words, the base station uses the R first PMIs for beamforming that acts on a reference signal resource in a CSI process of the type B. Beamforming on the reference signal resource of the type B can be trained by measuring the reference signal resource of the type A, so that accuracy of the beamforming that acts on the reference signal resource of the type B is effectively improved, and system performance based on the reference signal resource of the type B is further improved.

Figure 3A:
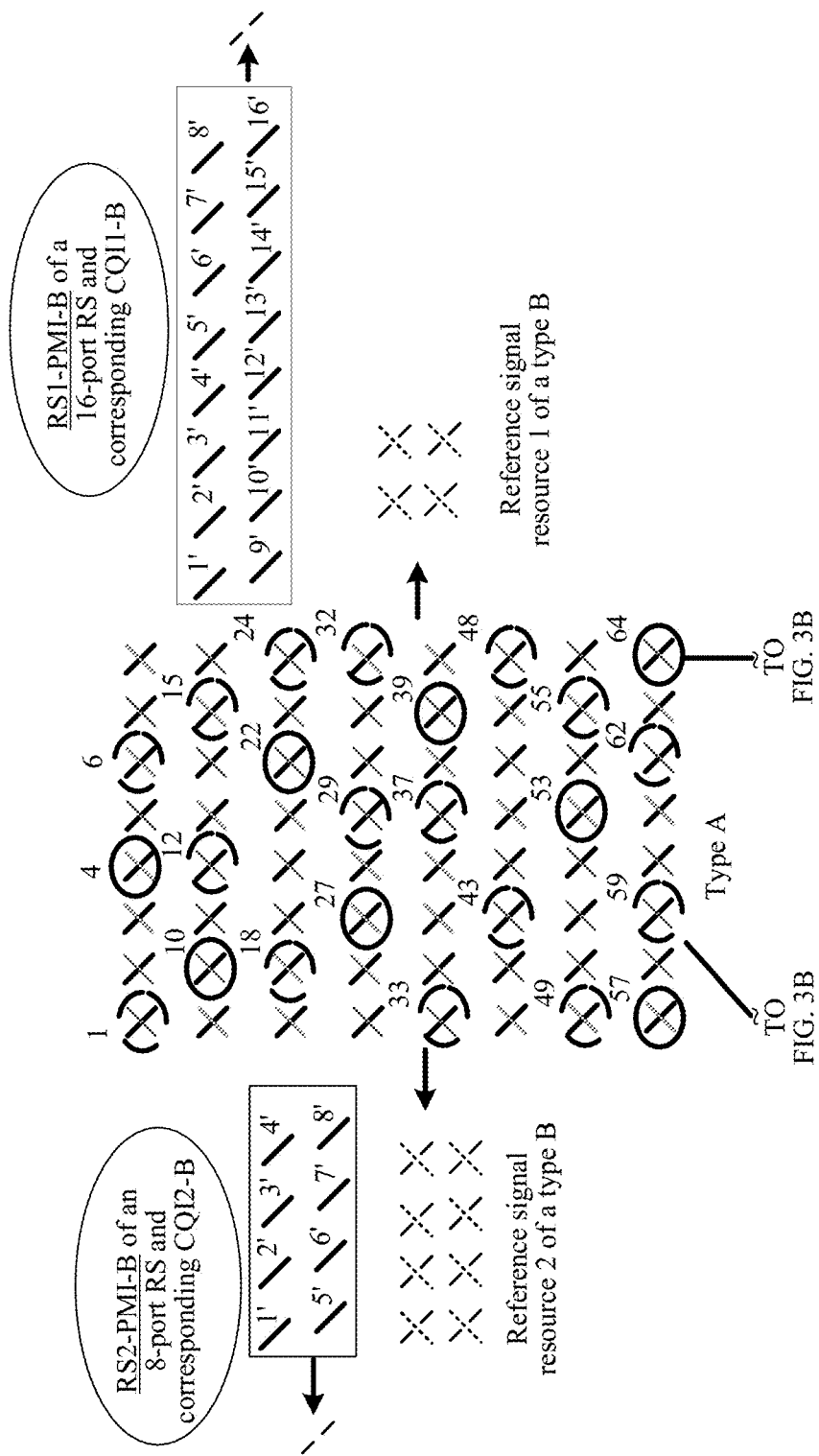
FIG. 3A and FIG. 3B are a schematic diagram of a specific example of the channel state information reporting method in FIG. 2.
Figure 3B:
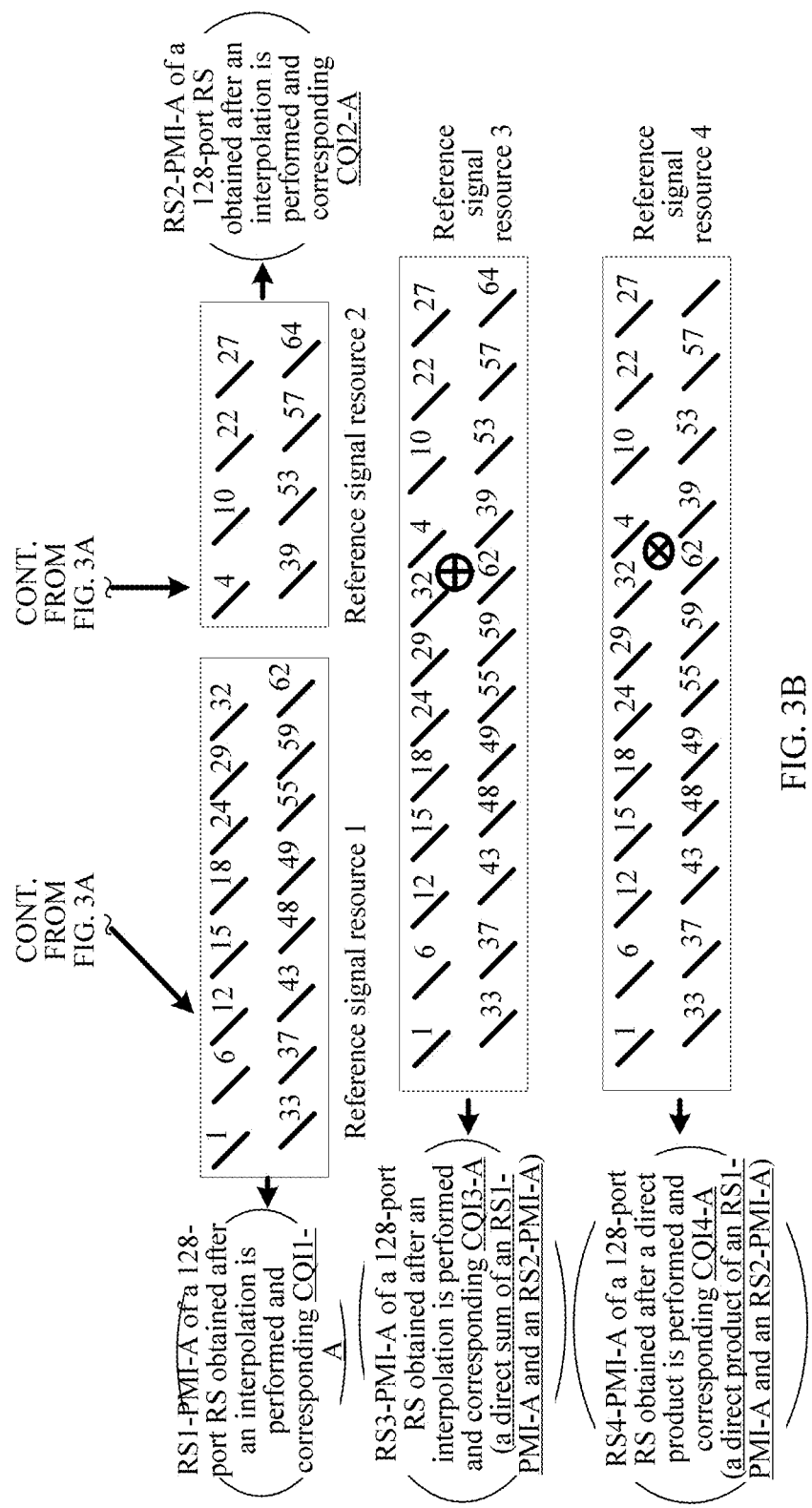

For example, referring to FIG. 3A and FIG. 3B, FIG. 3A and FIG. 3B are a schematic diagram of a specific example of the channel state information reporting method in FIG. 2. Configuration of a 128-antenna port reference signal resource of the type A and corresponding channel quality measurement and reporting are used as an example. It is assumed that there are two reference signal resources in a CSI process: a reference signal resource 1 (a 16-port reference signal resource) and a reference signal resource 2 (an 8-port reference signal resource). The terminal obtains a $1^{st}$ first PMI and a first CQI such as an RS1-PMI and a CQI1-A based on channel quality measurement on the reference signal resource 1. The CQI1-A is obtained based on a second PMI such as a PMI-1 obtained after the first operational criterion, in other words, an interpolation is performed on the first PMI. Likewise, the user obtains a $2^{nd}$ first PMI and a second CQI such as an RS2-PMI and a CQI2-A based on measurement on the reference signal resource 2. The CQI2-A is obtained based on a second PMI such as a PMI-2 obtained after an interpolation is performed on the $2^{nd}$ first PMI. In addition, the terminal may obtain a third CQI such as a CQI3-A based on measurement on a second PMI such as a PMI-3 obtained after an interpolation is performed on a direct sum of the $1^{st}$ first PMI and the $2^{nd}$ first PMI: the RS1-PMI and the RS2-PMI; or the terminal may obtain a fourth CQI such as a CQI4-A based on measurement on a second PMI such as a PMI-4 obtained after a direct product is performed on the $1^{st}$ first PMI and the $2^{nd}$ first PMI such as the RS1-PMI and the RS2-PMI.

The channel state information reported by the terminal includes the following two cases: (1) the $1^{st}$ first PMI such as the RS1-PMI, the $2^{nd}$ first PMI such as the RS2-PMI, and a CQI such as a CQIx-A, where the CQIx-A is one of the foregoing four CQIs; and (2) the $1^{st}$ first PMI such as the RS1-PMI, the $2^{nd}$ first PMI such as the RS2-PMI, and four CQIs: the CQI1-A, the CQI2-A, the CQI3-A, and the CQI4-A.

In addition, the base station may further determine, based on a $1^{st}$ first PMI and a $2^{nd}$ first PMI such as an RS1-PMI and an RS2-PMI of a reference signal resource of the type A reported by the terminal, a precoding matrix that acts on a reference signal resource of the type B and/or a quantity of ports of the reference signal resource of the type B.

Figure 4:
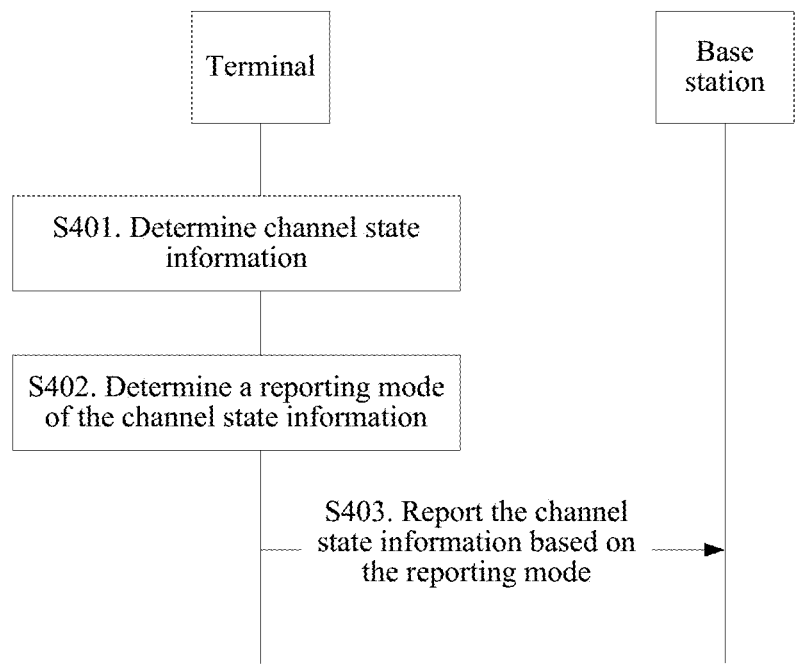
FIG. 4 is a schematic flowchart of another channel state information reporting method according to an embodiment of the present invention.

As shown in FIG. 4, a channel state information reporting method provided in an embodiment of the present invention includes the following steps.

S401. A terminal determines channel state information, where the channel state information includes first channel state information of a first reference signal resource and second channel state information of a second reference signal resource.

S402. The terminal determines a reporting mode of the channel state information.

S403. The terminal reports the channel state information based on the reporting mode, and a base station reads the channel state information reported by the terminal.

Optionally, content included in the first channel state information and the second channel state information may have the following three cases.

(1) The first channel state information includes at least one of an RI and a first PMI, and the second channel state information includes at least one of a reference signal resource index CRI, a CQI, and a second PMI.

(2) The first channel state information includes at least one of an RI, a first PMI, and a second PMI, and the second channel state information includes at least one of an RI, a CRI, a CQI, a first PMI, and a second PMI.

(3) The first channel state information includes at least one of an RI, a CQI, a first PMI, and a second PMI, and the second channel state information includes at least one of an RI, a CRI, a CQI, a first PMI, and a second PMI.

In addition, the first channel state information is long-term and slow-changing channel state information, and the second channel state information is short-term and fast-changing channel state information.

A dimension of the first PMI is independent of and decoupled from a dimension of the second PMI. The dimension of the first PMI is equal to a quantity of ports of the first reference signal resource, and the dimension of the second PMI is equal to a quantity of ports of the second reference signal resource. For example, the ports of the first reference signal resource are any subset (some or all) of total antenna ports, and the quantity of ports of the second reference signal resource is determined based on the first channel state information. Therefore, the dimension of the first reference signal resource is unrelated to the dimension of the second reference signal resource.

Based on the quantity of total antenna ports, a third PMI is determined by using the first PMI and the second PMI according to a predefined operational criterion. The predefined operational criterion may be one of a product, a direct product, a direct sum, an interpolation, and any other operational criterion. The CQI is calculated based on the first PMI and the second PMI, or the CQI is calculated based on the third PMI.

During specific implementation, two independent eMIMO types are configured for one CSI process, and each eMIMO type corresponds to one type of reference signal resource, for example, a first type of reference signal resource and a second type of reference signal resource. The first type of reference signal resource includes K1 reference signal resources, the second type of reference signal resource includes K2 reference signal resources, and the two types of reference signal resources correspond to one configuration parameter set, where K1 and K2 are integers greater than or equal to 1.

Case 1: In the CSI process, the first type of reference signal resource includes K1 reference signal resources, where K1≥1, and the second type of reference signal resource includes K2 reference signal resources, where K2=1.

First channel state information corresponding to the first type of reference signal resource includes any one of the following options.

Option 1: one first PMI and one RI.
Option 2: a plurality of first PMIs and one RI.
Option 3: one first PMI.
Option 4: a plurality of first PMIs.

In addition, the first channel state information may further include a second PMI and a CQI. A reporting mode of the first channel state information is a periodic reporting mode. Further, the first channel state information is fed back on a physical uplink control channel (PUCCH). The plurality of first PMIs in Option 2 and Option 4 may be reported by using a differential method. For example, the terminal reports a basic first PMI in Q (Q≥2) first PMIs and differential items of other first PMIs relative to the basic PMI. The basic first PMI may be a PMI with a minimum or maximum value in the plurality of first PMIs. This is not limited in the present invention. In addition, the base station and the terminal may also predefine a method for grouping the first PMIs. For example, a universal set of first PMIs is divided into Z (Z≥1) groups. The user reports a number of a group in which each of the Q first PMIs is distributed and a number of each first PMI in a corresponding PMI group. In other words, a plurality of first PMIs are reported by using a dual indication method.

Optionally, the plurality of first PMIs may be jointly encoded and reported. This corresponds to a new PUCCH reporting type. Alternatively, the plurality of first PMIs is respectively reported in a plurality of consecutive subframes. For example, the first PMI is fed back by bundling a plurality of subframes.

A reporting mode of second channel state information corresponding to the second type of reference signal resource is an aperiodic reporting mode. Optionally, the second channel state information is fed back on a physical uplink shared channel (PUSCH). The second channel state information includes at least one of an RI, a second PMI, and a CQI.

In another implementation, a reporting mode of the first channel state information may be an aperiodic reporting mode, and the first channel state information is fed back on a PUSCH. A reporting mode of the second channel state information is a periodic reporting mode, and the second channel state information is fed back on a PUCCH channel. Alternatively, a reporting mode of each of the first channel state information and the second channel state information is a periodic reporting mode or an aperiodic reporting mode. This is not limited in the present invention.

Case 2: In the CSI process, the first type of reference signal resource includes K1 reference signal resources, where K1≥1, and the second type of reference signal resource includes K2 reference signal resources, where K2≥1.

First channel state information corresponding to the first type of reference signal resource includes any one of the following options.

Option 1: G (G≥1) CRIs (CSI-RS Resource Index) and/or G (G≥1) RIs.
Option 2: a first PMI and/or a second PMI.
Option 3: K CSIs, where each CSI includes an RI, a PMI, and a CQI.

Second channel state information includes any one of the following options:

Option 1: a PMI and a CQI and/or an RI and/or a CRI.
Option 2: an RI, a CQI, and/or a PMI.
Option 3: an RI, a PMI, and a CQI.

The first channel state information and the second channel state information in Option 1 in Case 2 may be jointly reported by using one feedback mode. In addition, the foregoing reporting mode may be a periodic reporting mode or an aperiodic reporting mode. The CRI and the RI may be jointly encoded and reported, or may be separately reported. A reporting period of a first CRI is greater than or equal to a reporting period of a second CRI.

Optionally, the first channel state information in Option 1 in Case 2 may include H (H≥2) CRIs and/or H RIs. The H CRIs may be reported separately or jointly, or each of the H CRIs and a corresponding RI are jointly reported, and H CRIs and an RI are reported at different times.

In another implementation, H CRIs and/or H RIs or H CRIs and an RI are separately reported in H consecutive subframes. To be specific, the first channel state information is fed back by bundling a plurality of subframes.

In addition, a preferable key feature is summarized as follows: When two independent eMIMO types are configured for one CSI process, and each eMIMO type corresponds to one type of reference signal resource, if one of CSI reporting modes corresponding to the two types of reference signal resources is a periodic reporting mode, the other CSI reporting mode is an aperiodic reporting mode.

When the first channel state information includes at least two first PMIs or at least two CRIs, the at least two first PMIs or the at least two CRIs are jointly encoded and then reported. Optionally, the at least two first PMIs or the at least two CRIs are successively reported in each of a plurality of subframes by bundling the plurality of subframes.

Optionally, a period of the first reference signal resource is greater than or equal to a period of the second reference signal resource, and a subframe offset of the first reference signal resource is different from a subframe offset of the second reference signal resource.

Optionally, measurement limitation signaling of the first reference signal resource and measurement limitation signaling of the second reference signal resource are independently configured.

Optionally, sending and/or measurement limitation of each first reference signal resource and/or each second reference signal resource are/is notified by the base station by using higher layer signaling or layer 1 signaling.

For example, if there is not only a reference signal resource of a type A but also a reference signal resource of a type B in a CSI process, the base station may perform sending and/or measurement limitation on reference signal resources in the CSI process. For example, there are M reference signal resources in the CSI process. The base station notifies sending of the M reference signal resources and/or CSI measurement limitation on the M reference signal resources by using higher layer signaling or layer 1 signaling. In addition, the foregoing signaling for sending or limitation may be in a form of a bitmap. For example, 000111 indicates that only a fourth resource, a fifth resource, and a sixth resource in the M=6 reference signal resources are sent, or that the terminal needs to perform CSI measurement and/or reporting based on only a fourth resource, a fifth resource, and a sixth resource. An example in which a CRI is reported is used. The terminal only needs to perform measurement and/or corresponding resource selection based on a limited reference signal resource.

The measurement limitation in this solution mainly for signal measurement. A signal measurement parameter configured for higher layer signaling includes but is not limited to a measurement limitation switch, a measurement limitation time window length, and the like.

Optionally, the foregoing measurement limitation is measurement limitation performed on each reference signal resource. For example, when a CSI process includes K (K≥1) reference signal resources, the foregoing measurement limitation is measurement limitation performed on each of the K reference signal resources. The foregoing measurement limitation may be at least one of measurement limitation on signal measurement and measurement limitation on interference measurement.

Optionally, if the reported channel state information includes an RI, that the terminal determines the reporting mode of reporting the channel state information in step S402 is specifically implemented as follows: The terminal determines the reporting mode of the channel state information based on a method for measuring the reported RI.

Optionally, that the terminal determines the reporting mode of reporting the channel state information in step S402 is specifically implemented as follows: The terminal determines, based on a feedback type indicator, the reporting mode of reporting the channel state information.

Optionally, a reporting period of the first channel state information is greater than or equal to a reporting period of the second channel state information.

For example, if there is not only a reference signal resource of a type A but also a reference signal resource of a type B in a CSI process, the terminal may determine different reporting modes based on different methods for measuring the RI in step S402. For example, when the RI is measured based on the resource of the type A, in other words, the RI is included in the first channel state information, the reporting mode is correspondingly a type 1. Alternatively, when the RI is measured based on the resource of the type B, in other words, the RI is included in the second channel state information, the reporting mode is correspondingly a type 2.

In the type 1, the RI and the first PMI are jointly reported, the CRI is separately reported, and the CQI and/or the second PMI are/is jointly reported. A reporting period of the RI and the first PMI is greater than or equal to a reporting period of the CRI, and the reporting period of the CRI is greater than or equal to a reporting period of the CQI and/or the second PMI. In the type 2, the first PMI is separately reported, the CRI and/or the RI are/is jointly reported, and the CQI and/or the second PMI are/is jointly reported. A reporting period of the first PMI is greater than or equal to a reporting period of the CRI and/or the RI, and the reporting period of the CRI and/or the RI is greater than or equal to a reporting period of the CQI and/or the second PMI. Different feedback types are set in different channel state information reporting modes.

In addition, in step S402, the terminal may feed back a type indicator (Report type indicator, RTI) when feeding back the channel state information, to indicate a specific reporting mode used by the terminal to report the channel state information. For example, when the RTI indicator is 0, it indicates that the terminal feeds back the channel state information by using the reporting mode of the type 1, or when the RTI indicator is 1, it indicates that the terminal feeds back the channel state information by using the reporting mode of the type 2.

Optionally, in another implementation, before the terminal reports the channel state information, the base station may configure the RTI indicator for the terminal. The terminal reports the channel state information based on the reporting mode indicated by the RTI.

It may be learned that the first channel state information is slow-changing and long-term channel state information, and the second channel state information is fast-changing and short-term channel state information. Therefore, the first reference signal resource corresponding to the first channel state information may have a relatively long sending period, and antenna ports of the first reference signal resource may be only some of total antenna ports, so as to reduce resource overheads. In addition, the second reference signal resource corresponding to the second channel state information is determined based on the first channel state information. For example, beamforming that acts on the second reference signal resource is based on precoding matrix indicator information in the first channel state information, and a quantity of ports of the second reference signal resource is based on rank indicator information in the first channel state information, so that accuracy of the beamforming that acts on the second reference signal resource and system performance are effectively improved.

In addition, a sending time of the first reference signal resource is decoupled from a sending time of the second reference signal resource, so that the first reference signal resource has a relatively long sending period, reducing first reference signal resource overheads in a time domain dimension.

The following describes an apparatus for implementing the foregoing method in the embodiments of the present invention with reference to the accompanying drawings.

Figure 5:
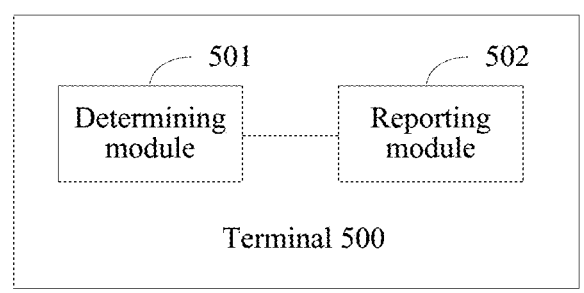
FIG. 5 is a schematic structural diagram of a terminal according to an embodiment of the present invention.

Referring to FIG. 5, FIG. 5 is a schematic structural diagram of a terminal according to an embodiment of the present invention.

As shown in FIG. 5, the terminal 500 may include a determining module 501 and a reporting module 502.

The determining module 501 is configured to: determine R first precoding matrix indicators PMIs of M first reference signal resources, and determine a channel quality indicator CQI based on the R first PMIs, where M and R are integers greater than or equal to 1.

The reporting module 502 is configured to report channel state information, where the channel state information includes the R first PMIs and N CQIs, or the channel state information includes the R first PMIs and one CQI, the R first PMIs are used by a base station to determine P second PMIs according to a first operational criterion, a dimension of the second PMI is greater than a dimension of the first PMI, and P and N are integers greater than or equal to 1.

Optionally, if the channel state information includes the R first PMIs and the N CQIs, the determining module 501 is specifically configured to determine the P second PMIs and/or the N CQIs based on the R first PMIs and the first operational criterion.

Alternatively, if the channel state information includes the R first PMIs and the CQI, the determining module 501 is specifically configured to determine one second PMI and one CQI based on the R first PMIs and a second operational criterion.

Optionally, if the channel state information includes the R first PMIs and the CQI, the channel state information further includes a CQI index indicator corresponding to the CQI.

Optionally, the first operational criterion and the second operational criterion are configured by the base station for the terminal, or the first operational criterion and the second operational criterion are predefined by the base station and the terminal.

Optionally, the first operational criterion and the second operational criterion include at least one of a direct product, a direct sum, and an interpolation.

Optionally, the R first PMIs are used by the base station to determine a precoding matrix and/or a quantity of ports of a second reference signal resource.

It should be noted that the foregoing modules (the determining module 501 and the reporting module 502) are configured to perform related steps of the foregoing method.

In this embodiment, the terminal 500 is presented in a form of a module. The "module" herein may be an application-specific integrated circuit (application-specific integrated circuit, ASIC), a processor and a memory that execute one or more software or firmware programs, an integrated logic circuit, and/or another component that can provide the foregoing functions. In addition, the determining module 501 may be implemented by using a processor and a memory in FIG. 9. The reporting module 502 may report the channel state information to the base station by using a communications interface between the terminal and the base station.

The following describes an apparatus for implementing the foregoing method in the embodiments of the present invention with reference to the accompanying drawings.

Figure 6:
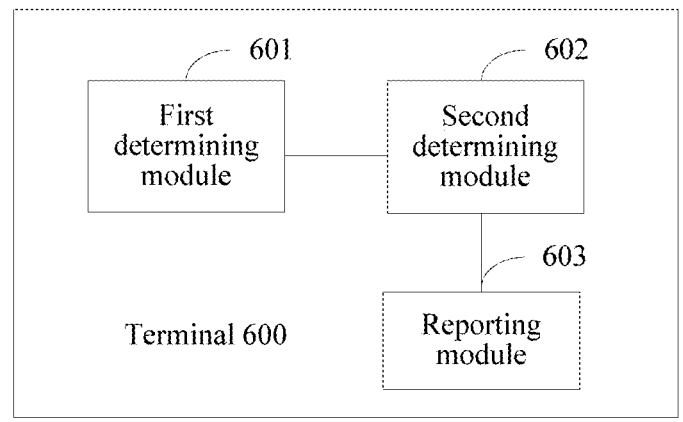
FIG. 6 is a schematic structural diagram of a terminal according to an embodiment of the present invention.

Referring to FIG. 6, FIG. 6 is a schematic structural diagram of another terminal according to an embodiment of the present invention.

As shown in FIG. 6, the terminal 600 may include a first determining module 601, a second determining module 602, and a reporting module 603.

The first determining module 601 is configured to determine channel state information, where the channel state information includes first channel state information of a first reference signal resource and second channel state information of a second reference signal resource.

The second determining module 602 is configured to determine a reporting mode of the channel state information.

The reporting module 603 is configured to report the channel state information based on the reporting mode determined by the second determining module.

Optionally, a period of the first reference signal resource is greater than or equal to a period of the second reference signal resource, and a subframe offset of the first reference signal resource is different from a subframe offset of the second reference signal resource.

Optionally, measurement limitation signaling of the first reference signal resource and measurement limitation signaling of the second reference signal resource are independently configured.

Optionally, sending and/or measurement limitation of each first reference signal resource and/or each second reference signal resource are/is notified by a base station by using higher layer signaling or layer 1 signaling.

Optionally, the second determining module is specifically configured to determine, based on a feedback type indicator, the reporting mode of reporting the channel state information.

Optionally, the channel state information includes a rank indicator RI, and the second determining module is specifically configured to determine the reporting mode of the channel state information based on a method for measuring the RI.

Optionally, the first channel state information includes at least one of a rank indicator and a first precoding matrix indicator, and the second channel state information includes at least one of a reference signal resource index, a channel quality indicator, and a second precoding matrix indicator; or the first channel state information includes at least one of a rank indicator, a first precoding matrix indicator, and a second precoding matrix indicator, and the second channel state information includes at least one of a rank indicator, a reference signal resource index, a channel quality indicator, a first precoding matrix indicator, and a second precoding matrix indicator; or the first channel state information includes at least one of a rank indicator, a channel quality indicator, a first precoding matrix indicator, and a second precoding matrix indicator, and the second channel state information includes at least one of a rank indicator, a reference signal resource index, a channel quality indicator, a first precoding matrix indicator, and a second precoding matrix.

Optionally, a reporting period of the first channel state information is greater than or equal to a reporting period of the second channel state information.

It should be noted that the foregoing modules (the first determining module 601, the second determining module 602, and the reporting module 603) are configured to perform related steps of the foregoing method.

In this embodiment, the terminal 600 is presented in a form of a module. The "module" herein may be an application-specific integrated circuit (application-specific integrated circuit, ASIC), a processor and a memory that execute one or more software or firmware programs, an integrated logic circuit, and/or another component that can provide the foregoing functions. In addition, the first determining module 601 and the second determining module 602 may be implemented by using a processor and a memory in FIG. 9. The reporting module 603 may report the channel state information to the base station by using a communications interface between the terminal and the base station.

The following describes an apparatus for implementing the foregoing method in the embodiments of the present invention with reference to the accompanying drawings.

Figure 7:
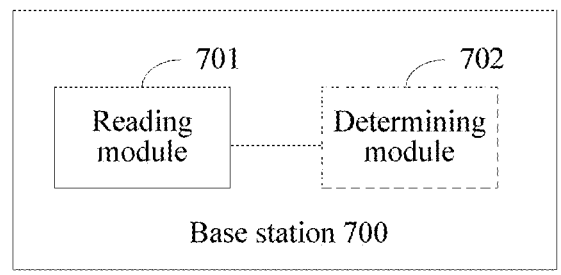
FIG. 7 is a schematic structural diagram of a base station according to an embodiment of the present invention.

Referring to FIG. 7, FIG. 7 is a schematic structural diagram of a base station according to an embodiment of the present invention.

As shown in FIG. 7, the base station 700 may include a reading module 701.

The reading module 701 is configured to read channel state information reported by a terminal, where the channel state information includes R first PMIs and N CQIs, or the channel state information includes the R first PMIs and one CQI, the R first PMIs are used by the base station to determine P second PMIs according to a first operational criterion, a dimension of the second PMI is greater than a dimension of the first PMI, and R, P, and N are integers greater than or equal to 1.

Optionally, the first operational criterion and the second operational criterion are configured by the base station for the terminal, or the first operational criterion and a second operational criterion are predefined by the base station and the terminal.

Optionally, the first operational criterion and the second operational criterion include at least one of a direct product, a direct sum, and an interpolation.

Optionally, the base station 700 further includes a determining module 702, configured to determine a precoding matrix and/or a quantity of ports of a second reference signal resource based on the R first PMIs.

It should be noted that the foregoing modules (the reading module 701 and the determining module 702) are configured to perform related steps of the foregoing method.

In this embodiment, the base station 700 is presented in a form of a module. The "module" herein may be an application-specific integrated circuit (application-specific integrated circuit, ASIC), a processor and a memory that execute one or more software or firmware programs, an integrated logic circuit, and/or another component that can provide the foregoing functions. In addition, the determining module 701 may be implemented by using a processor and a memory in FIG. 9. The reading module 701 may read, by using a communications interface of the base station, the channel state information reported by the terminal.

The following describes an apparatus for implementing the foregoing method in the embodiments of the present invention with reference to the accompanying drawings.

Figure 8:
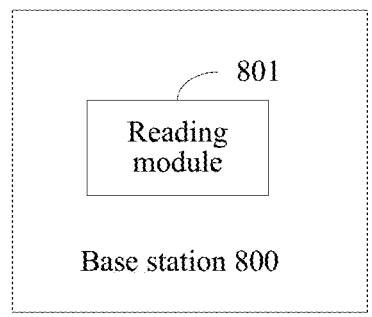
FIG. 8 is a schematic structural diagram of a base station according to an embodiment of the present invention.

Referring to FIG. 8, FIG. 8 is a schematic structural diagram of another base station according to an embodiment of the present invention.

As shown in FIG. 8, the base station 800 may include a reading module 801.

The reading module is configured to read channel state information reported by a terminal, where the channel state information includes first channel state information of a first reference signal resource and second channel state information of a second reference signal resource, and a reporting mode of the channel state information is determined by the terminal based on the channel state information.

Optionally, a period of the first reference signal resource is greater than or equal to a period of the second reference signal resource, and a subframe offset of the first reference signal resource is different from a subframe offset of the second reference signal resource.

Optionally, measurement limitation signaling of the first reference signal resource and measurement limitation signaling of the second reference signal resource are independently configured.

Optionally, sending and/or measurement limitation of each first reference signal resource and/or each second reference signal resource are/is notified by the base station by using higher layer signaling or layer 1 signaling.

It should be noted that the foregoing module (the reading module 801) is configured to perform related steps of the foregoing method.

In this embodiment, the base station 800 is presented in a form of a module. The "module" herein may be an application-specific integrated circuit (application-specific integrated circuit, ASIC), a processor and a memory that execute one or more software or firmware programs, an integrated logic circuit, and/or another component that can provide the foregoing functions. In addition, the reading module 801 may read, by using a communications interface of the base station, the channel state information reported by the terminal.

Figure 9:
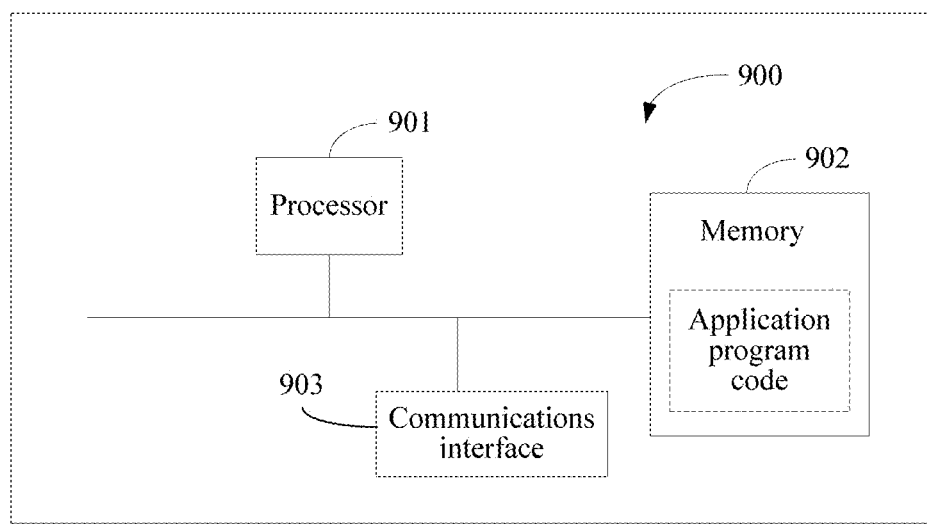
FIG. 9 is a schematic structural diagram of a communications device according to an embodiment of the present invention.

As shown in FIG. 9, the terminal 500, the terminal 600, the base station 700, and the base station 800 may be implemented by using a structure of a communications device shown in FIG. 9. The communications device 900 includes at least one processor 901, at least one memory 902, and at least one communications interface 903. In addition, the communications device 900 may further include a general purpose component such as an antenna. Details are not described herein.

The processor 901 may be a general purpose central processing unit (CPU), a microprocessor, an application-specific integrated circuit (ASIC), or one or more integrated circuits configured to control program execution of the foregoing solution.

The communications interface 903 is configured to communicate with another device or communications network, such as an Ethernet network, a radio access network (RAN), or a wireless local area network (WLAN).

The memory 902 may be a read-only memory (ROM), another type of static storage device that can store static information and an instruction, a random access memory (RAM), or another type of dynamic storage device that can store information and an instruction, or may be an electrically erasable programmable read-only memory (EEPROM), a compact disc read-only memory (CD-ROM), another optical disk storage or optical disc storage (including a compact disc, a laser disc, an optical disc, a digital versatile disc, a Blu-ray disc, and the like), a disk storage medium or another magnetic storage device, or any other medium that can be used to carry or store expected program code in a form of an instruction or a data structure and that can be accessed by a computer. However, this is not limited thereto. The memory may exist independently and is connected to the processor by using a bus. Alternatively, the memory may be integrated with the processor.

The memory 902 is configured to store application program code used to execute the foregoing solution, and the processor 801 controls and executes the program code. The processor 901 is configured to execute the application program code stored in the memory 802.

If the communications device shown in FIG. 9 is a terminal, the code stored in the memory 902 may be used to perform the channel state information reporting method performed by the terminal provided above. For example, the terminal determines R first precoding matrix indicators PMIs of M first reference signal resources, and determines a channel quality indicator CQI based on the R first PMIs. Finally, the terminal reports channel state information, where the channel state information includes the R first PMIs and N CQIs, or the channel state information includes the R first PMIs and one CQI, the R first PMIs are used by a base station to determine P second PMIs according to a first operational criterion, and a dimension of the second PMI is greater than a dimension of the first PMI.

If the communications device shown in FIG. 9 is a terminal, the code stored in the memory 902 may be used to perform the channel state information reporting method performed by the terminal provided above. For example, the terminal determines channel state information, where the channel state information includes first channel state information of a first reference signal resource and second channel state information of a second reference signal resource. Then the terminal determines a reporting mode of the channel state information, and reports the channel state information based on the reporting mode.

If the communications device shown in FIG. 9 is a base station, the code stored in the memory 902 may be used to perform the channel state information reading method performed by the base station provided above. For example, the base station reads channel state information reported by a terminal, where the channel state information includes R first PMIs and N CQIs, or the channel state information includes the R first PMIs and one CQI, the R first PMIs are used by the base station to determine P second PMIs according to a first operational criterion, and a dimension of the second PMI is greater than a dimension of the first PMI.

If the communications device shown in FIG. 9 is a base station, the code stored in the memory 902 may be used to perform the channel state information reading method performed by the base station provided above. For example, the base station reads channel state information reported by a terminal, where the channel state information includes first channel state information of a first reference signal resource and second channel state information of a second reference signal resource, and a reporting mode of the channel state information is determined by the terminal based on the channel state information.

If the communications device shown in FIG. 9 is a base station, the processor 901 may be a processor on a board of the base station, or may be one or more integrated circuits or chips on a board of the base station. In addition, the memory 802 may be integrated with the processor 801, or the memory 902 and the processor 901 may be disposed separately.

An embodiment of the present invention further provides a computer storage medium. The computer storage medium may store a program. When the program is executed, some or all steps of any one of the channel state information reporting method and the channel state information reading method recorded in the method embodiments are included.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage. Based on such an understanding, the technical solutions of the present invention essentially, or the part contributing to the prior art, or all or some of the technical solutions may be implemented in the form of a software product. The software product is stored in a storage and includes several instructions for enabling a computer device (which may be a personal computer, a server, a network device, or the like) to perform all or some of the steps of the methods described in the embodiments of the present invention. The foregoing storage includes: any medium that can store program code, such as a USB flash drive, a read-only memory (ROM), a random access memory (RAM), a removable hard disk, a magnetic disk, or an optical disc.

A person of ordinary skill in the art may understand that all or some of the steps of the methods in the embodiments may be implemented by a program instructing relevant hardware. The program may be stored in a computer-readable storage. The storage may include a flash memory, a read-only memory (ROM), a random access memory (RAM), a magnetic disk, an optical disc, or the like.

The embodiments of the present invention are described in detail above. The principle and implementation of the present invention are described herein through specific examples. The description about the embodiments is merely provided to help understand the method and core ideas of the present invention. In addition, a person of ordinary skill in the art can make variations to the present invention in terms of the specific implementations and application scopes according to the ideas of the present invention. Therefore, the content of specification shall not be construed as a limit to the present invention.

What is claimed is:

1. A method, comprising:
   determining, by a terminal, R first precoding matrix indicators (PMIs) of M first reference signal resources, wherein M and R are integers greater than 1;
   determining a first channel quality indicator (CQI) based on the R first PMIs; and
   reporting, by the terminal, channel state information, wherein the channel state information comprises the R first PMIs and N CQIs including the first CQI, or the channel state information comprises the R first PMIs and one CQI, wherein the one CQI is the first CQI, wherein the R first PMIs are used by a base station to determine P second PMIs according to a first operational criterion, a dimension of each of the P second PMIs is greater than a dimension of each of the R first PMIs, and P and N are integers greater than 1.

2. The method according to claim 1, wherein:

when the channel state information comprises the R first PMIs and the N CQIs, determining the first CQI based on the R first PMIs comprises:
  determining, by the terminal, the P second PMIs or the N CQIs based on the R first PMIs and the first operational criterion; and when the channel state information comprises the R first PMIs and the one CQI, determining the first CQI based on the R first PMIs comprises:
  determining, by the terminal, one second PMI and the one CQI based on the R first PMIs and a second operational criterion.

3. The method according to claim 2, wherein:

the first operational criterion and the second operational criterion are configured by the base station for the terminal; or the first operational criterion and the second operational criterion are predefined by the base station and the terminal.

4. The method according to claim 2, wherein the first operational criterion and the second operational criterion comprise a direct product, a direct sum, or an interpolation.

5. The method according to claim 1, wherein the channel state information comprises the R first PMIs and the one CQI, and the channel state information further comprises a CQI index indicator corresponding to the one CQI.

6. The method according to claim 1, wherein the channel state information comprises the R first PMIs and N CQIs including the first CQI.

7. The method according to claim 1, wherein the channel state information comprises the R first PMIs and one CQI.

8. A terminal, comprising:

a processor, configured to determine R first precoding matrix indicators (PMIs) of M first reference signal resources, and determine a first channel quality indicator (CQI) based on the R first PMIs, wherein M and R are integers greater than 1; and a transmitter, configured to report channel state information, wherein the channel state information comprises the R first PMIs and N CQIs including the first CQI, or the channel state information comprises the R first PMIs and one CQI, wherein the one CQI is the first CQI, and wherein the R first PMIs are used by a base station to determine P second PMIs according to a first operational criterion, a dimension of each of the P second PMIs is greater than a dimension of each of the R first PMIs, and P and N are integers greater than 1.

9. The terminal according to claim 8, wherein the processor is configured to:

when the channel state information comprises the R first PMIs and the N CQIs, determine the P second PMIs or the N CQIs based on the R first PMIs and the first operational criterion; or when the channel state information comprises the R first PMIs and the one CQI, determine one second PMI and the one CQI based on the R first PMIs and a second operational criterion.

10. The terminal according to claim 9, wherein the first operational criterion and the second operational criterion are configured by the base station for the terminal, or the first operational criterion and the second operational criterion are predefined by the base station and the terminal.

11. The terminal according to claim 9, wherein the first operational criterion and the second operational criterion comprise a direct product, a direct sum, or an interpolation.

12. The terminal according to claim 8, wherein the channel state information comprises the R first PMIs and the one CQI, and the channel state information further comprises a CQI index indicator corresponding to the one CQI.

13. The terminal according to claim 8, wherein the channel state information comprises the R first PMIs and N CQIs including the first CQI.

14. The terminal according to claim 8, wherein the channel state information comprises the R first PMIs and one CQI.

15. A non-transitory computer-readable storage medium storing a program that is executable by at least one processor, the program comprising instructions for:

determining R first precoding matrix indicators (PMIs) of M first reference signal resources, and determine a first channel quality indicator (CQI) based on the R first PMIs, wherein M and R are integers greater than 1; and reporting channel state information, wherein the channel state information comprises the R first PMIs and N CQIs including the first CQI, or the channel state information comprises the R first PMIs and one CQI, wherein the one CQI is the first CQI, and wherein the R first PMIs are used by a base station to determine P second PMIs according to a first operational criterion, a dimension of each of the P second PMIs is greater than a dimension of each of the R first PMIs, and P and N are integers greater than 1.

16. The non-transitory computer-readable storage medium according to claim 15, wherein the program further includes instructions for:

when the channel state information comprises the R first PMIs and the N CQIs, determining the P second PMIs or the N CQIs based on the R first PMIs and the first operational criterion; or when the channel state information comprises the R first PMIs and the one CQI, determining one second PMI and the one CQI based on the R first PMIs and a second operational criterion.

17. The non-transitory computer-readable storage medium according to claim 16, wherein the first operational criterion and the second operational criterion are configured by the base station for a terminal, or the first operational criterion and the second operational criterion are predefined by the base station and the terminal.

18. The non-transitory computer-readable storage medium according to claim 16, wherein the first operational criterion and the second operational criterion comprise a direct product, a direct sum, or an interpolation.

19. The non-transitory computer-readable storage medium according to claim 16, wherein the channel state information comprises the R first PMIs and the one CQI, and the channel state information further comprises a CQI index indicator corresponding to the one CQI.

* * * * *